May 16, 1967     J. W. MARRON     3,319,722
COVER FOR A BULLDOZER ATTACHMENT TOOTH
Filed Jan. 17, 1966     2 Sheets-Sheet 1
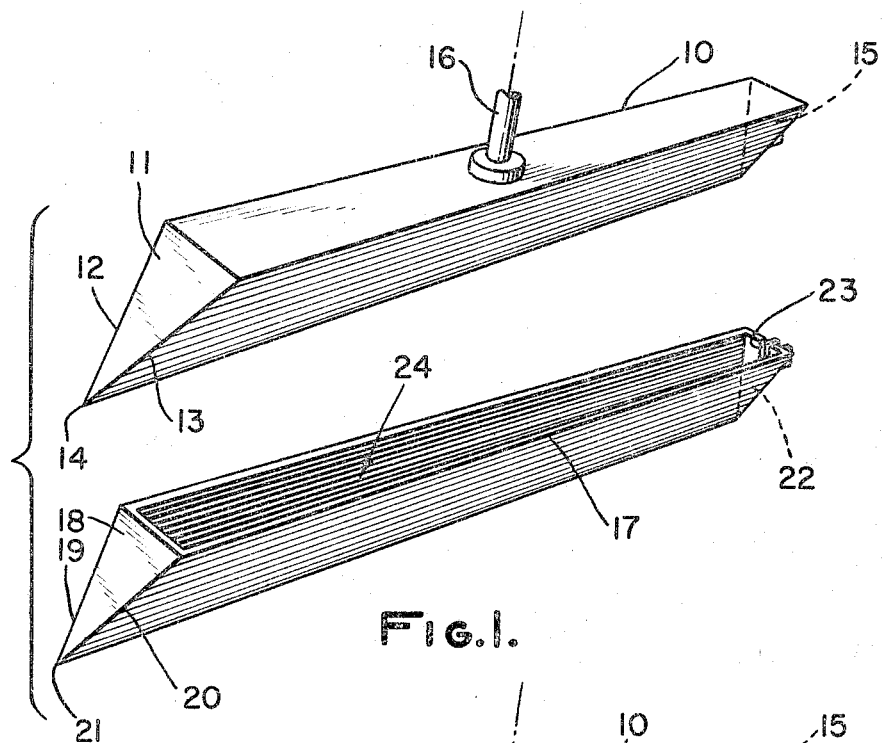
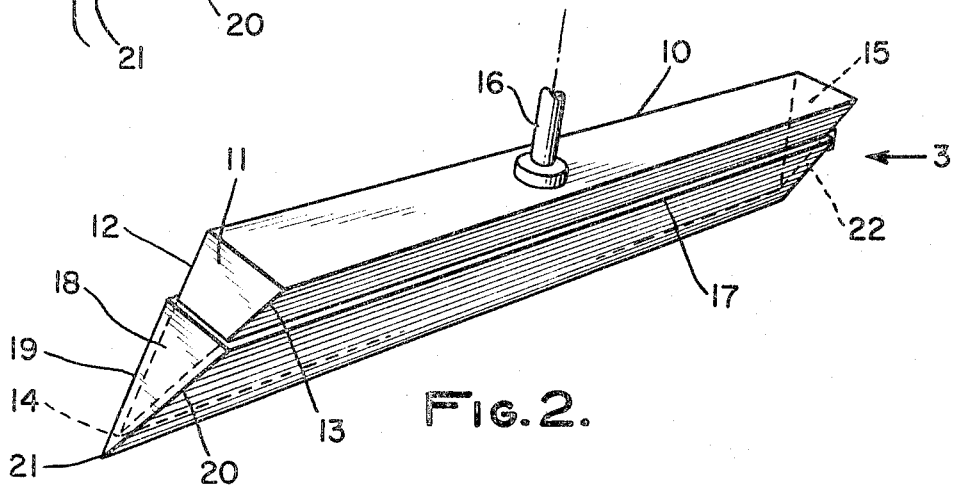
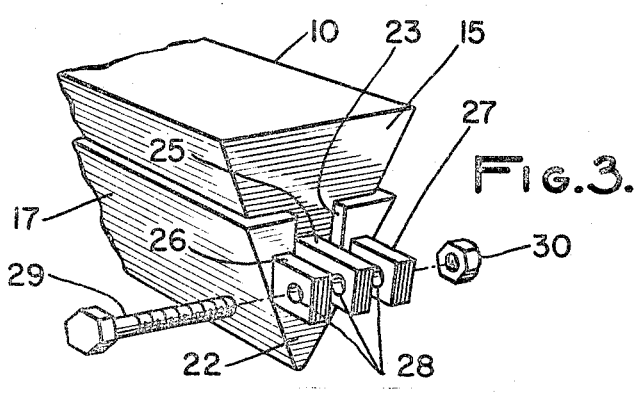
INVENTOR
JOHN W. MARRON
BY
*Elliott & Pastoriza*
ATTORNEYS INVENTOR.
JOHN W. MARRON
BY
Elliott & Pastoriza
ATTORNEYS

United States Patent Office 3,319,722
Patented May 16, 1967

3,319,722
COVER FOR A BULLDOZER ATTACHMENT TOOTH
John W. Marron, 1318 Partridge Lane,
Oceanside, Calif. 92054
Filed Jan. 17, 1966, Ser. No. 521,122
4 Claims. (Cl. 172—719)

This application is a continuation-in-part of my co-pending patent application, Ser. No. 340,072, filed Jan. 24, 1964, and entitled, "Cover for a Bulldozer Attachment Tooth," now abandoned.

This invention relates generally to earth working equipment and more particularly to a novel cover structure for earth engaging teeth such as employed on bulldozer attachments and the like.

In my U.S. Patent No. 3,200,891, entitled, "Bulldozer Attachment," there is disclosed a novel attachment for a bulldozer in the form of a plurality of elongated teeth swivelly mounted and adapted to be driven over the ground surface by the bulldozer in a manner to effect efficient mixing of water and soil. Each of the teeth is uniquely shaped in a manner to effect the desired turning over of the soil and mixing of the water, and this unique design renders the replacement of teeth expensive.

With the foregoing in mind, it is a primary object of this invention to provide a novel cover structure for a bulldozer tooth of the type described in my above-mentioned U.S. patent to the end that each tooth upon which a cover is placed is protected from direct engagement with the ground along its lower portion so that all that need be replaced after extended use is the cover structure itself.

More particularly, it is an object to provide a tooth cover particularly designed to cooperate with a tooth employed in an attachment for a bulldozer which is very readily applied to the tooth without special tools.

Another object is to provide a tooth cover which is secured against relative longitudinal sliding movement and sidewise movement with respect to the tooth so that the manipulation of soil by the various teeth can be carried out substantially the same as if the covers were not used.

A further important object is to provide a tooth cover as described in my above-mentioned co-pending patent application which includes additional cutting means for penetrating the ground surface to mix and "work" the soil to the optimum consistency and density more quickly and efficiently than heretofore possible.

Still another object is to provide a novel tooth cover of rugged and simple construction which insures operation for long periods without the necessity of repair or replacement.

Briefly, these and other objects and advantages of this invention are attained by providing a cover made of extremely hard metal in an elongated trough shape for receiving the lower portions of the tooth. In the preferred embodiment, the trough structure defines a V-shaped cavity for receiving the inverted triangular cross-sectional shape of the tooth in question. A forward undercut cavity portion serves to overlap or lock to the front or nose portion of the tooth itself. The rear portion of the cover includes cooperating securement means for securing the same to the rear portion of the tooth.

With each tooth suitably covered by a cover structure as described, the bulldozer may be employed in the manner as described in my U.S. patent and the brunt of wear will be taken by the tooth covers rather than the teeth themselves. When any cover wears out, it is a simple matter to replace the same.

In accordance with an important feature of the invention, the tooth cover may be provided with a plurality of downwardly extending cutting members for more efficient working and mixing of the soil.

A better understanding of the invention will be had by now referring to a preferred embodiment thereof as illustrated in the accompanying drawings, in which:

FIGURE 1 is an exploded view illustrating one typical tooth of the type employed in the bulldozer attachment described in my U.S. patent together with the novel tooth blade cover of the instant invention;

FIGURE 2 is a perspective view illustrating the tooth cover in position on the tooth blade;

FIGURE 3 is a fragmentary rear perspective view looking in the direction of the arrow 3 of FIGURE 2;

Figure 4:
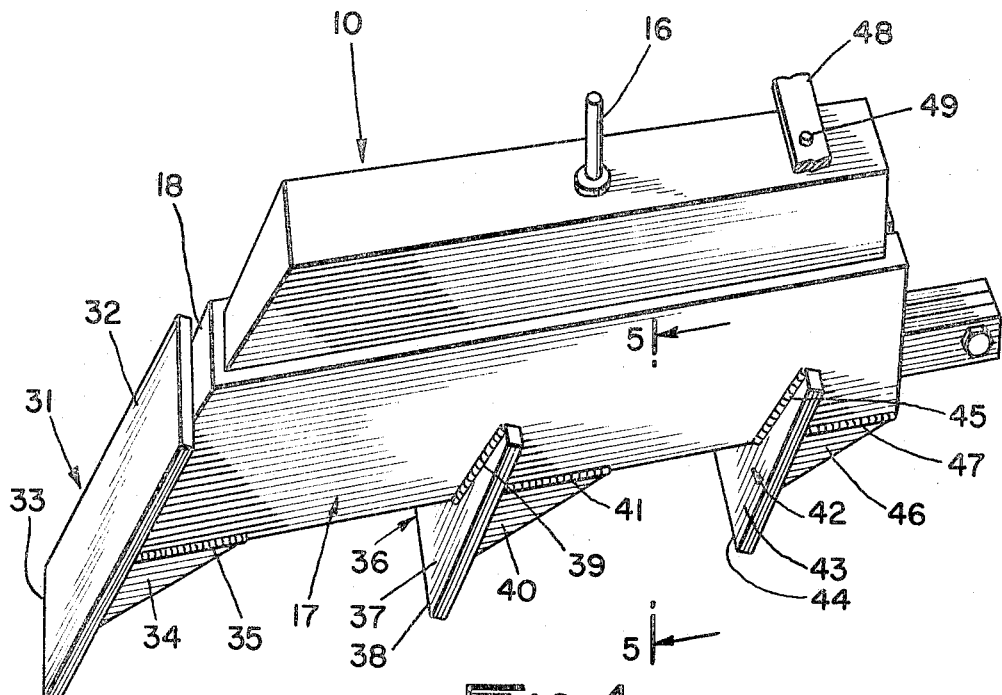
FIGURE 4 is a perspective view illustrating the novel tooth cover including cutting members secured thereto in accordance with the invention.

Referring first to FIGURE 1, there is shown a bulldozer attachment tooth 10 having a generally inverted triangular cross-section. As shown, the front end portion of the tooth 10 slopes generally forwardly and downwardly as at 11, the opposite front edges 12 and 13 converging towards each other to terminate in a point 14 coincident with the apex of the inverted triangular cross-section. The rear of the tooth 10 is of substantially flat triangular shape as indicated at 15. A pivot pin 16 is shown secured to the top surface of the tooth 10 to enable swivelling movement of the tooth when employed on the attachment described in my U.S. patent.

Disposed below the tooth 10 is a cover 17 for the tooth formed in accordance with the present invention. As shown, the cover includes a front end portion 18 which slopes forwardly and downwardly to define thereunder an undercut cavity portion. The edges of the front sloping portion as indicated at 19 and 20 converge towards each other to a point 21, the geometry being similar to that for the edges 12 and 13 and the nose point 14 of the tooth 10.

The rear of the cover 17 is of triangular shape as indicated at 22 and includes a vertical slot 23, the purpose for which will become clearer as the description proceeds.

Generally, the cover is of an elongated trough structure defining a V-shaped cavity as indicated at 24. This cavity is arranged to receive the lower end or apex portions of the inverted triangular cross-section of the tooth 10.

FIGURE 2 illustrates the cover 17 in position on the tooth 10. It will be noted that the sloping front end 11 of the tooth 10 is received within the undercut cavity portion at the front end 18 of the cover 17. The rear end 22 in turn extends upwardly to overlap the rear face 15 of the tooth 10.

Because of the undercut arrangement, it is necessary to insert the forward or nose portion 14 of the tooth 10 into the undercut cavity portion of the cover 17 before attempting to position the entire lower portion of the tooth 10 within the V-shaped cavity. After the front end 11 of the tooth 10 has been received in the undercut cavity portion to bear against the rear surface of the front end 18 of the cover 17, the remaining portion of the cover may be swung upwardly to receive the lower rear portion of the tooth. The rear end 22 of the cover will then overlap and engage the rear end 15 of the tooth as illustrated.

Since there are overlapping portions in the front as a consequence of the undercut cavity, the front end of the cover 17 is adequately secured to the front end of the tooth 10. However, to prevent the rear end of the cover 17 from dropping away from the rear end of the tooth 10, there is provided a rear securing means as shown in FIGURE 3.

Referring to FIGURE 3, this securing means includes a first bracket member 25 secured to the rear end 15 of the tooth 10 and extending in a direction to pass through the slot 23 in the cover 17. Cooperating with the bracket member 25 are second and third bracket members 26 and 27 secured, respectively, on either side of the slot 23. These latter brackets also extend rearwardly in a position to sandwich the bracket 25 therebetween. The brackets include aligned openings 28 when the cover is positioned on the tooth. The fastening is completed by a bolt 29 and nut 30 arranged to secure the brackets in their relative positions as shown in FIGURE 3.

The material forming the cover 17 is of an extremely hard metal and will be able to withstand the brunt of punishment during earth working operations. Should the cover 17 become worn and pitted beyond further use, it is a simple matter to remove the bolt 29 and slip the cover from the lower end of the tooth blade 10. A new cover may then be fitted in place.

Because of the undercut cavity portion and geometry of the cover generally relative to the tooth 10, it will be evident that replacement of the cover can be effected without special tools. Moreover, it will be clear that once the pin 29 and nut 30 are secure with respect to the brackets, the cover is locked to the bottom portion of the tooth and prevented from both longitudinal as well as side-to-side relative movement.

Referring now to FIGURE 4, there is shown a second embodiment of the novel tooth cover of this invention. In this embodiment, a first cutting member 31 is secured as by welding to the sloping front end 18 of the tooth cover 17. The first cutting member 31 includes a front face 32 which, as shown, slopes downwardly and forwardly with respect to the longitudinal axis of the cover 17 and terminates in a generally transversely extending cutting edge 33. In order to rigidly suppport the cutting member 31 on the cover 17, a generally triangular gusset plate 34 is secured to the rear side of the cutting member 31 and is secured to the bottom edge of the cover 17 as by welding shown at 35.

A second cutting member 36 is secured to the bottom of the cover 17 at a distance rearwardly from the first cutting member 31 and includes a front face 37 extending downwardly and forwardly with respect to the longitudinal axis of the cover 17. As shown, the second cutting member 36 terminates in a generally transversely extending cutting edge 38 and extends beneath the bottom of the cover 17 approximately the same distance as does the cutting edge 33 of the first cutting member 31. The means by which the second cutting member 36 is secured to the cover 17 includes a welded portion as shown at 39 in addition to a generally triangular gusset plate 40 secured to the rear of the second cutting member 36 and welded to the bottom edge of the cover 17 as at 41.

In a similar manner, a third cutting member 42 is shown secured to the bottom edge of the cover 17 a distance rearwardly of the second cutting member 36 and includes a front face 43 likewise terminating in a generally transversely extending cutting edge 44. The third cutting member 42 is secured to the cover 17 as by welding shown at 45 and in addition by means of a generally triangular gusset plate 46 secured to the bottom edge of the cover 17 as by welding shown at 47. The third cutting member 42 is thus a substantial duplicate of the above-described second cutting member 36. The cover may include further cutting members spaced along its lower portion, if desired.

As described in my above-mentioned U.S. patent, the tooth 10 may be pivotally connected to the bulldozer blade attachment by means of the pivot pin 16 and is movable about the pin 16 by means of a cross bar 48 receiving a second pivot pin 49 as shown.

Figure 5:
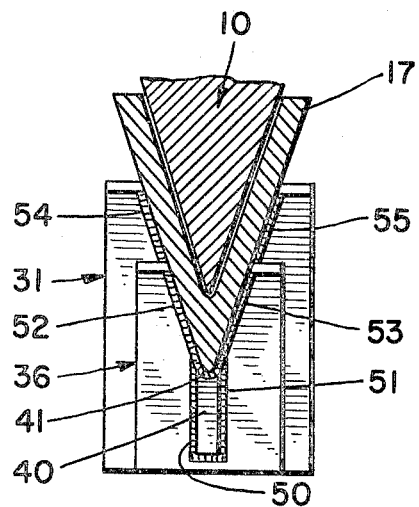
FIGURE 5 is a partial cross-sectional view taken in the direction of arrows 5—5 of FIGURE 4.

Referring now to FIGURE 5, it will be seen that the gusset plate 40 is secured as by welding to the rear face of the cutting member 36 as shown at 50 and 51. The cutting member 36 is further secured to the cover 17 as by welding shown at 52 and 53. In a similar manner, the first cutting member 31 is secured to the cover 17 as by welding shown at 54 and 55.

In the operation of the embodiment of FIGURES 4 and 5, the cutting members 31, 36, and 42 penetrate the ground surface as the tooth 10 and the attached cover 17 are moved forwardly to the left as shown in FIGURE 4. This penetration is quickly and easily accomplished and maintained since the cutting members slope downwardly and forwardly with respect to the longitudinal extent and direction of travel of the tooth and cover. As a further result of the above-mentioned slope, the soil coming into contact with the respective cutting members is moved upwardly and aside from the cutting members, thereby efficiently mixing and "working" the soil to the optimum consistency and density in a minimum number of "passes" over the ground.

It is apparent that the respective gusset plates serve to rigidly support the respective cutting members by transferring much of the force on the cutting members to the bottom of the cover.

Should unusually heavy loads be imposed on the tooth cover with or without the cutting members, causing damage to the cover, it is a relatively simple matter to replace the entire tooth cover with a new tooth cover of the type shown in FIGURES 1 to 3 or 4 and 5.

From the foregoing description, it will thus be evident that the present invention has provided a novel cover for a bulldozer attachment tooth in which the various objects set forth heretofore are fully realized.

What is claimed is:

1. A cover for a bulldozer tooth of inverted triangular cross section and having a forwardly and downwardly sloping front end terminating in a nose point coincident with the apex of said inverted triangular cross section, said cover comprising: an elongated trough shaped structure of hard metal defining a V-shaped cavity for receiving the lower portion of said tooth, the front end of said cavity extending forwardly and downwardly to define an undercut cavity portion for receiving the nose portion of said tooth and securing the front end of said cover to said tooth, the rear end of said cover including a rear end portion extending upwardly in engagement with the rear end of said tooth, said portion having a vertical slot; a first bracket member secured to the rear end of said tooth in a position to project rearwardly through said slot; second and third bracket members secured to said rear end portion of said cover adjacent either side of said slot and extending rearwardly to sandwich said first bracket member therebetween, said first, second, and third bracket members having transversely extending openings arranged to be in co-axial alignment when said cover is positioned on said tooth; and a bolt adapted to be passed through said aligned openings to secure the rear portion of said cover to said tooth.

2. The subject matter of claim 1, including a plurality of soil cutting members secured to said cover at spaced points along its longitudinal axis.

3. The subject matter of claim 2, in which each of said cutting members includes a plate sloping downwardly and forwardly with respect to said cover and terminating in a transversely extending cutting edge.

4. The subject matter of claim 3, including a gusset plate secured to each of said cutting members and the bottom of said cover for rigidly securing said cutting members on said cover.

References Cited by the Examiner

UNITED STATES PATENTS

| | | | |
|---|---|---|---|
| 4,127 | 7/1845 | Bullock. | |
| 186,803 | 1/1877 | Conaway | 172—719 |
| 321,187 | 6/1885 | Casaday. | |
| 1,707,426 | 4/1929 | Baker | 172—719 |
| 1,741,933 | 12/1929 | Gunnison | 37—143 |
| 2,884,082 | 4/1959 | Osterhaus | 172—719 |
| 3,160,967 | 12/1964 | Nichols | 37—141 |

FOREIGN PATENTS 631,994  12/1961  Canada.

ABRAHAM G. STONE, *Primary Examiner.*

A. E. KOPECKI, *Assistant Examiner.*